(12) United States Patent
Vazquez-Canteli et al.

(10) Patent No.: US 12,204,611 B2
(45) Date of Patent: Jan. 21, 2025

(54) AUTOMATIC LINK PREDICTION FOR POINTS IN COMMERCIAL AND INDUSTRIAL ENVIRONMENTS

(71) Applicant: Mapped Inc., El Segundo, CA (US)

(72) Inventors: Jose Vazquez-Canteli, Honolulu, HI (US); Jason Koh, San Diego, CA (US)

(73) Assignee: Mapped Inc., El Segundo, CA (US)

( * ) Notice: Subject to any disclaimer, the term of this patent is extended or adjusted under 35 U.S.C. 154(b) by 0 days.

(21) Appl. No.: 18/144,105

(22) Filed: May 5, 2023

(65) Prior Publication Data

US 2023/0359705 A1  Nov. 9, 2023

Related U.S. Application Data

(60) Provisional application No. 63/339,370, filed on May 6, 2022.

(51) Int. Cl.
| | | |
|---|---|---|
| *G06F 18/2321* | (2023.01) | |
| *G05B 19/418* | (2006.01) | |
| *G06F 17/16* | (2006.01) | |
| *G06F 18/25* | (2023.01) | |

(52) U.S. Cl.
CPC ..... *G06F 18/2321* (2023.01); *G05B 19/4188* (2013.01); *G06F 17/16* (2013.01); *G06F 18/25* (2023.01)

(58) Field of Classification Search
CPC ....... G06F 18/2321; G06F 17/16; G06F 18/25
See application file for complete search history.

(56) References Cited

U.S. PATENT DOCUMENTS

| | | |
|---|---|---|
| 8,566,070 B2 | 10/2013 | Tamaki et al. |
| 2009/0037415 A1* | 2/2009 | Ramberg ............... G06F 18/00 |
| 2011/0178977 A1 | 7/2011 | Drees |

(Continued)

FOREIGN PATENT DOCUMENTS

| | | |
|---|---|---|
| WO | WO-2023215896 A1 | 11/2023 |
| WO | WO-2023215903 A1 | 11/2023 |

OTHER PUBLICATIONS

Gauger et al., "Sensor-based Clustering for Indoor Applications" IEEE SECON 2008 (Year: 2008).*

(Continued)

*Primary Examiner* — John C Kuan
(74) *Attorney, Agent, or Firm* — WILSON SONSINI GOODRICH & ROSATI

(57) ABSTRACT

Disclosed are methods and systems for predicting relationships between points in automated environments by retrieving a plurality of data points from a plurality of data sources associated with an automated environment, wherein the plurality of data points comprises timeseries data structure; detecting a plurality of events based on the plurality of data points, wherein an event of the plurality of data points is indicative of an anomaly reading of one or more states associated with the plurality of data sources; generating a correlation matrix of events across the plurality of data points; suppressing non-physical relation factors in the correlation matrix by normalization to generate a normalized matrix; and clustering the data points based on the normalized matrix, wherein the clustered data points represent the data points belonging to a same data source.

19 Claims, 3 Drawing Sheets

(56) References Cited

U.S. PATENT DOCUMENTS

| | | |
|---|---|---|
| 2013/0055037 A1 | 2/2013 | Nonogaki |
| 2015/0026521 A1 | 1/2015 | Yabuki |
| 2015/0074117 A1 | 3/2015 | Gorelik et al. |
| 2015/0378806 A1 | 12/2015 | Natsumeda |
| 2016/0342707 A1 | 11/2016 | Drobek et al. |
| 2017/0103148 A1 | 4/2017 | Natsumeda |
| 2018/0173795 A1 | 6/2018 | Cobbett et al. |
| 2018/0373234 A1 | 12/2018 | Khalate et al. |
| 2019/0064789 A1* | 2/2019 | Natsumeda ........ G05B 23/0267 |
| 2019/0265088 A1* | 8/2019 | Natsumeda ............. G01D 3/08 |
| 2020/0106660 A1* | 4/2020 | Kakani ............... H04L 41/0645 |
| 2020/0151199 A1 | 5/2020 | Nakamura |
| 2020/0252233 A1 | 8/2020 | O'Keeffe |
| 2021/0048797 A1 | 2/2021 | Sinha et al. |
| 2021/0157671 A1 | 5/2021 | Shastri et al. |
| 2021/0333762 A1 | 10/2021 | Govindaraj et al. |
| 2021/0382944 A1 | 12/2021 | Li et al. |
| 2022/0066456 A1 | 3/2022 | Ebrahimi Afrouzi et al. |
| 2022/0376980 A1 | 11/2022 | Bhat |

OTHER PUBLICATIONS

Yuste-Delgado et al., "A Distributed Clustering Algorithm Guided by the Base Station to Extend the Lifetime of Wireless Sensor Networks" Sensors 2020, 20, 2312 (Year: 2020).*
Co-pending U.S. Appl. No. 18/144,109, inventor Jose Vazquez-Canteli, filed May 5, 2023.
PCT/SU2023/066697 International Search Report and Written Opinion dated Sep. 19, 2023.
PCT/US2023/066706 International Search Report and Written Opinion dated Sep. 19, 2023.
U.S. Appl. No. 18/144,109 Office Action dated Aug. 17, 2023.
Wikipedia "Spearman's rank correlation coefficient" pp. 11 (2023).
Wikipedia "Pearson correlation coefficient" pp. 12 (2023).
U.S. Appl. No. 18/144,109 Office Action dated Dec. 28, 2023.
U.S. Appl. No. 18/144,109 Office Action dated Sep. 10, 2024.

* cited by examiner

AUTOMATIC LINK PREDICTION FOR POINTS IN COMMERCIAL AND INDUSTRIAL ENVIRONMENTS

CROSS-REFERENCE TO RELATED APPLICATIONS

This application claims the priority and benefit of U.S. Provisional Application No. 63/339,370, filed May 6, 2022, and entitled: AUTOMATIC LINK PREDICTION FOR POINTS IN COMMERCIAL AND INDUSTRIAL ENVIRONMENTS, the content of which is incorporated herein by reference in its entirety.

BACKGROUND

Automation is the use of control systems to operate processes without human intervention. These systems generally include software, computers, beacons, sensors, actuators, and in some cases robotics. In industrial and commercial settings, benefits of automation include increases in productivity, accuracy, flexibility, and safety, while providing overall cost savings. A "smart building" uses a combination of technologies to automate building management. The terms "smart office" and "smart home" are used to describe a structure that uses technology to allow systems and electronics to communicate with one another, be controlled by a time schedule, be able to provide analytics and visualization of the smart office or smart home, and even be remotely activated from a smartphone or other web-enabled device. A few of the systems that can be controlled include lighting, heating, ventilation, air conditioning, vertical lifts, fire safety systems, appliances, and security systems. As such, smart buildings can provide comfort and convenience while enhancing security and energy efficiency. Cities of the future are anticipated to offer a wide array of "smart technologies," e.g., networked technology that controls aspects of transportation, energy, air, and water quality.

SUMMARY

In automated industrial and commercial environments, it is crucial to extract insights out of the data to understand relationships between data points, such as sensors, actuators, or parameters, and their associated devices. This invention automatically identifies the relationships at scale by detecting and analyzing correlated events present in the points' timeseries data.

Relationships among points are often undefined and they must be manually determined and labeled by looking at diverse data sources, including point names, equipment types, mechanical drawings, or time-series data. Properly labeling the links between points and devices is critical for further analyzing the data from these automated environments and extracting meaningful information. However, labeling these data is a labor intensive and error-prone process which limits the scalability and the speed at which these built environments can be automated.

Accordingly, in one aspect, disclosed herein are computer-implemented methods comprising: retrieving a plurality of data points from a plurality of data sources associated with an automated environment, wherein the plurality of data points comprises data in timeseries data structure; detecting a plurality of events based on the plurality of data points, wherein an event of the plurality of data points is indicative of an anomaly reading of one or more states associated with the plurality of data sources; generating a correlation matrix of events across the plurality of data points; suppressing non-physical relation factors in the correlation matrix by normalization to generate a normalized matrix; and clustering the data points based on the normalized matrix, wherein the clustered data points represent the data points belonging to a same data source.

In various embodiments, the automated environment comprises a building, a warehouse, a factory, or a campus. In some embodiments, the plurality of data sources comprises Internet of Things (IoT) devices. In further embodiments, the plurality of data points comprises a reading of a data sources, and wherein the timeseries data structure is indicative of the reading at different time points or time periods. In some embodiments, the correlation matrix is a binary matrix. In other embodiments, the correlation matrix is a symmetric matrix. In some embodiments, suppressing non-physical relation factors in the correlation matrix further comprises: dividing the correlation matrix into a plurality of submatrices based at least in part on a type of the data points; normalizing each submatrix of the plurality of submatrices by a matrix normalization mechanism; aggregating the plurality of normalized submatrices to generate an updated correlation matrix; and normalizing the updated correlation matrix by the matrix normalization mechanism. In some embodiments, the type of the data points comprises an indicator of the function of the data points, respectively. In further embodiments, the indicator comprises: temperature measure, humidity reading, lighting reading, motion sensor reading, device operation reading, air flow speed reading, and the like. In some embodiments, the matrix normalization mechanism comprises a subtraction of a measure of central tendency of every row from the elements of the row, and the division of the resulting elements in every row by a measure of dispersion of every original row. In some embodiments, the matrix normalization mechanism comprises a subtraction of a measure of central tendency of every column from the elements of the column, and the division of the resulting elements in every column by a measure of dispersion of every original column. In some embodiments, the matrix normalization mechanism comprises a scaling operation of every row between two values. In some embodiments, the matrix normalization mechanism comprises a scaling operation of every column between two values. In some embodiments, the matrix normalization mechanism comprises a matrix transformation operation using a shortest path algorithm. In some embodiments, the matrix normalization mechanism comprises an operation to fill the main diagonal of the matrix with zeroes. In some embodiments, the clustering the data points based on the normalized matrix comprises using a graph clustering algorithm. In some embodiments, the correlation matrix is normalized by a link type, wherein the link type is indicative of a relationship between two data points.

In an aspect, disclosed herein are systems comprising: a data points retrieving module configured to retrieve a plurality of data points from a plurality of data sources associated with an automated environment, wherein the plurality of data points comprises data in timeseries data structure; an events extraction module configured to detect a plurality of events based on the plurality of data points, wherein an event of the plurality of data points is indicative of an anomaly reading of one or more states associated with the plurality of data sources; a correlation matrix generation module configured to generate a correlation matrix of events across the plurality of data points; a factor suppression engine configured to suppress non-physical relation factors in the correlation matrix by normalization to generate a normalized matrix; and a data points clustering engine configured to cluster the data points based on the normalized matrix, wherein the clustered data points represent the data points belonging to a same data source.

In various embodiments, the automated environment comprises a building, a warehouse, a factory, or a campus. In some embodiments, the plurality of data sources comprises Internet of Things (IoT) devices. In further embodiments, the plurality of data points comprises a reading of a data sources, and wherein the timeseries data structure is indicative of the reading at different time points or time periods. In some embodiments, the correlation matrix is a binary matrix. In other embodiments, the correlation matrix is a symmetric matrix. In some embodiments, the factor suppression engine is further configured to divide the correlation matrix into a plurality of submatrices based at least in part on a type of the data points; normalize each submatrix of the plurality of submatrices by a matrix normalization mechanism; aggregate the plurality of normalized submatrices to generate an updated correlation matrix; and normalize the updated correlation matrix by the matrix normalization mechanism. In some embodiments, the type of the data points comprises an indicator of the function of the data points, respectively. In further embodiments, the indicator comprises: temperature measure, humidity reading, lighting reading, motion sensor reading, device operation reading, air flow speed reading, and the like. In some embodiments, the matrix normalization mechanism comprises a subtraction of a measure of central tendency of every row from the elements of the row, and the division of the resulting elements in every row by a measure of dispersion of every original row. In some embodiments, the matrix normalization mechanism comprises a subtraction of a measure of central tendency of every column from the elements of the column, and the division of the resulting elements in every column by a measure of dispersion of every original column. In some embodiments, the matrix normalization mechanism comprises a scaling operation of every row between two values. In some embodiments, the matrix normalization mechanism comprises a scaling operation of every column between two values. In some embodiments, the matrix normalization mechanism comprises a matrix transformation operation using a shortest path algorithm. In some embodiments, the matrix normalization mechanism comprises an operation to fill the main diagonal of the matrix with zeroes. In some embodiments, the clustering the data points based on the normalized matrix comprises using a graph clustering algorithm. In some embodiments, the correlation matrix is normalized by a link type, wherein the link type is indicative of a relationship between two data points.

In an aspect, disclosed herein are one or more non-transitory computer-readable storage media coupled to one or more processors and having instructions stored thereon which, when executed by the one or more processors, cause the one or more processors to perform operations comprising: retrieving a plurality of data points from a plurality of data sources associated with an automated environment, wherein the plurality of data points comprises data in timeseries data structure; detecting a plurality of events based on the plurality of data points, wherein an event of the plurality of data points is indicative of an anomaly reading of one or more states associated with the plurality of data sources; generating a correlation matrix of events across the plurality of data points; suppressing non-physical relation factors in the correlation matrix by normalization to generate a normalized matrix; and clustering the data points based on the normalized matrix, wherein the clustered data points represent the data points belonging to a same data source.

In various embodiments, the automated environment comprises a building, a warehouse, a factory, or a campus. In some embodiments, the plurality of data sources comprises Internet of Things (IoT) devices. In further embodiments, the plurality of data points comprises a reading of a data sources, and wherein the timeseries data structure is indicative of the reading at different time points or time periods. In some embodiments, the correlation matrix is a binary matrix. In other embodiments, the correlation matrix is a symmetric matrix. In some embodiments, the operation of suppressing non-physical relation factors in the correlation matrix further comprises: dividing the correlation matrix into a plurality of submatrices based at least in part on a type of the data points; normalizing each submatrix of the plurality of submatrices by a matrix normalization mechanism; aggregating the plurality of normalized submatrices to generate an updated correlation matrix; and normalizing the updated correlation matrix by the matrix normalization mechanism. In some embodiments, the type of the data points comprises an indicator of the function of the data points, respectively. In further embodiments, the indicator comprises: temperature measure, humidity reading, lighting reading, motion sensor reading, device operation reading, air flow speed reading, and the like. In some embodiments, the matrix normalization mechanism comprises a subtraction of a measure of central tendency of every row from the elements of the row, and the division of the resulting elements in every row by a measure of dispersion of every original row. In some embodiments, the matrix normalization mechanism comprises a subtraction of a measure of central tendency of every column from the elements of the column, and the division of the resulting elements in every column by a measure of dispersion of every original column. In some embodiments, the matrix normalization mechanism comprises a scaling operation of every row between two values. In some embodiments, the matrix normalization mechanism comprises a scaling operation of every column between two values. In some embodiments, the matrix normalization mechanism comprises a matrix transformation operation using a shortest path algorithm. In some embodiments, the matrix normalization mechanism comprises an operation to fill the main diagonal of the matrix with zeroes. In some embodiments, the clustering the data points based on the normalized matrix comprises using a graph clustering algorithm. In some embodiments, the correlation matrix is normalized by a link type, wherein the link type is indicative of a relationship between two data points.

BRIEF DESCRIPTION OF THE DRAWINGS

A better understanding of the features and advantages of the present subject matter will be obtained by reference to the following detailed description that sets forth illustrative embodiments and the accompanying drawings of which.

DETAILED DESCRIPTION

Figure 1:
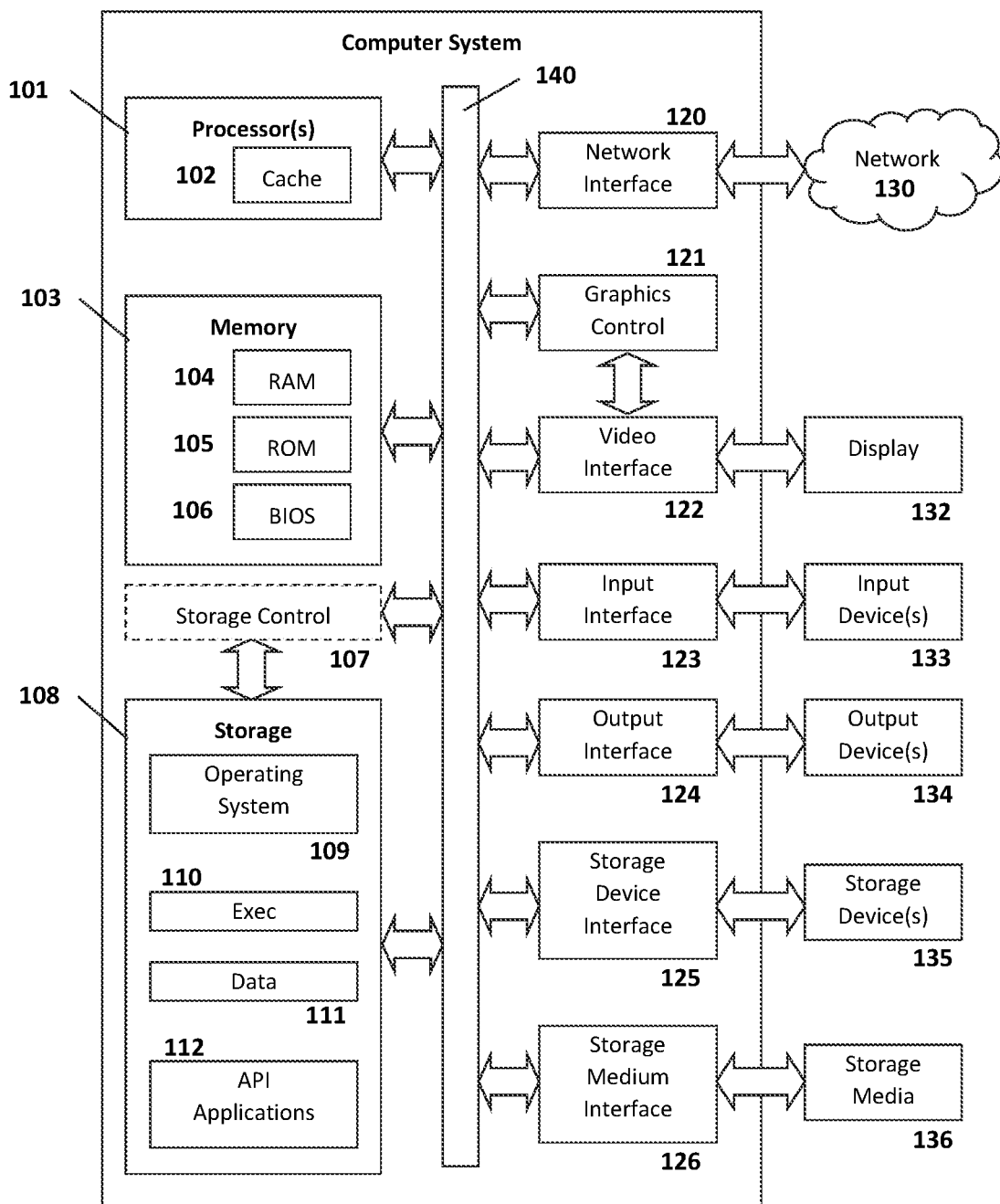
FIG. 1 shows a non-limiting example of a computing device; in this case, a device with one or more processors, memory, storage, and a network interface.

Described herein, in certain embodiments, are computer-implemented methods comprising: retrieving a plurality of data points from a plurality of data sources associated with an automated environment, wherein the plurality of data points comprises data in timeseries data structure; detecting a plurality of events based on the plurality of data points, wherein an event of the plurality of data points is indicative of an anomaly reading of one or more states associated with the plurality of data sources; generating a correlation matrix of events across the plurality of data points; suppressing non-physical relation factors in the correlation matrix by normalization to generate a normalized matrix; and clustering the data points based on the normalized matrix, wherein the clustered data points represent the data points belonging to a same data source.

In various embodiments, the automated environment comprises a building, a warehouse, a factory, or a campus. In some embodiments, the plurality of data sources comprises Internet of Things (IoT) devices. In further embodiments, the plurality of data points comprises a reading of a data sources, and wherein the timeseries data structure is indicative of the reading at different time points or time periods. In some embodiments, the correlation matrix is a binary matrix. In other embodiments, the correlation matrix is a symmetric matrix. In some embodiments, suppressing non-physical relation factors in the correlation matrix further comprises: dividing the correlation matrix into a plurality of submatrices based at least in part on a type of the data points; normalizing each submatrix of the plurality of submatrices by a matrix normalization mechanism; aggregating the plurality of normalized submatrices to generate an updated correlation matrix; and normalizing the updated correlation matrix by the matrix normalization mechanism. In some embodiments, the type of the data points comprises an indicator of the function of the data points, respectively. In further embodiments, the indicator comprises: temperature measure, humidity reading, lighting reading, motion sensor reading, device operation reading, air flow speed reading, and the like. In some embodiments, the matrix normalization mechanism comprises a subtraction of a measure of central tendency of every row from the elements of the row, and the division of the resulting elements in every row by a measure of dispersion of every original row. In some embodiments, the matrix normalization mechanism comprises a subtraction of a measure of central tendency of every column from the elements of the column, and the division of the resulting elements in every column by a measure of dispersion of every original column. In some embodiments, the matrix normalization mechanism comprises a scaling operation of every row between two values. In some embodiments, the matrix normalization mechanism comprises a scaling operation of every column between two values. In some embodiments, the matrix normalization mechanism comprises a matrix transformation operation using a shortest path algorithm. In some embodiments, the matrix normalization mechanism comprises an operation to fill the main diagonal of the matrix with zeroes. In some embodiments, the clustering the data points based on the normalized matrix comprises using a graph clustering algorithm. In some embodiments, the correlation matrix is normalized by a link type, wherein the link type is indicative of a relationship between two data points.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

As used herein, the "Internet of Things" or "IoT" refers to the network of physical devices, buildings, vehicles, and other objects that feature an IP address for internet network connectivity for exchanging data, wherein the network comprises, for example, ethernet, IP, serial buses, and/or other forms of communication between two or more IoT devices.

As used herein, "machine learning (ML) model type" refers a specific mathematical framework to be trained to make predictions or decisions. Example ML model types are gradient boosting, SVM, neural networks, and variants thereof. Some further examples of ML models may comprise:

Supervised learning models: These models are trained on labeled data, which means that the data includes both input examples and corresponding correct output values. Examples of supervised learning models include decision trees, support vector machines, and logistic regression.

Unsupervised learning models: These models are trained on unlabeled data, which means that the data includes input examples but no corresponding output values. Unsupervised learning models are used to discover patterns and relationships in the data. Examples of unsupervised learning models include clustering algorithms and deep belief networks.

Semi-supervised learning models: These models are trained on a mix of labeled and unlabeled data. They can be useful in situations where it is difficult or expensive to obtain a large amount of labeled data. Examples of semi-supervised learning models include graph-based algorithms and self-training algorithms.

Reinforcement learning models: These models are trained to take actions in an environment in order to maximize a reward signal. They are commonly used in applications like robot control and game playing. Examples of reinforcement learning models include Q-learning algorithms and Markov decision processes.

As used herein, "machine learning (ML) model" refers to an instance of a specific ML model type trained over a set of training data. This can perform predictions and make decisions. Examples of some other functions that ML model may provide in connection with the subject matter described herein may comprise:

Automated device discovery: ML model can be used to scan a network and automatically discover and identify IoT devices that are connected to it. This can create an accurate map of the devices on the network and make it easier to manage the device.

Location tracking: ML model can be used to track the location of IoT devices in real-time, either by using GPS or by analyzing the signal strength of the device's connection to the network. This can be used for applications like asset tracking or location-based services.

Network optimization: ML model can be used to analyze the performance of an IoT network and identify ways to optimize it, such as by identifying bottlenecks or identifying devices that are consuming a disproportionate amount of bandwidth, and/or energy.

Predictive maintenance: ML model can be used to analyze data from IoT devices to predict when they are likely to fail or need maintenance. This can help to prevent disruptions and improve the overall reliability of the network.

Generate semantic map: ML model can be used to collect data from IoT devices and generate semantic map accordingly. The ML model may generate the semantic map by applying it to the data collected by the IoT devices. The output of the model will be a representation of the semantics of the data, which can be displayed as a map or in some other format. The resulting map could be used, for example, to visualize the distribution of different types of devices within a building or to identify patterns in the data that may be used to optimize the performance of the devices or the overall system.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular structures, features, or characteristics may be combined in any suitable manner in one or more embodiments.

Overview

This disclosure provides a framework to utilize noisy and approximate event detection mechanisms for finding meaningful relationships between points and devices. In some cases, it may be difficult to identify meaningful relationships between different devices or points in a building, due to the noisy nature of the data that is being collected. This can be caused by a variety of factors, such as interference from other devices, errors in the sensors, or other issues that can lead to inaccurate or unreliable data. In order to overcome these challenges, the present subject matter provides a framework for using noisy and approximate event detection mechanisms to identify meaningful relationships between points and devices in a building. By using these techniques, it is possible to extract meaningful information from the data, even when it is noisy or imperfect, and to use this information to better understand the operation of the building and its systems.

The variables obtained from those sensors, actuators, or parameters are referred to as "points," which are linked to different devices or pieces of equipment. The value of a point at a certain time represents the current status of the point, i.e., the status of a device's operation or a physical phenomenon of an environment at that time. A time-series data is a series of such values and may represent events associated with related points or devices. However, it is difficult to detect events precisely caused by relationships with others due to the noisy nature of the observations and compounding factors in the real world.

The objective of the subject matter described herein is to identify which variables (obtained from sensors, actuators, or parameters) are related (i.e., lined) to the same device. These variables are referred to as "points." The value of a point at a certain time represents the current status of that point, which could be related to the operation of a device or a physical phenomenon in the environment. It is difficult to determine if two points are related to the same device simply based on their raw correlations, because points with the same type of observation (e.g., temperature) may be more correlated with each other than points within the same device, and points that represent different types of observations may be biased towards being less correlated with each other even if they do belong to the same device.

Instead of relying on raw correlations among timeseries data, the systems and methods described herein detects significant events after normalizing the timeseries data, and then finds correlations among those events. The systems and methods may identify relationships between different variables (points) that are collected from sensors, actuators, or other parameters in a smart building. These points are linked to different devices or pieces of equipment, and the value of a point at a certain time represents the current status or condition of the device or equipment. Instead of just looking at raw correlations between these points, the systems and methods may normalize the data and look for significant events. The systems and methods may then use these normalized correlations to cluster the points and determine whether they belong to the same device or equipment. This can be used to identify the relationships between different devices and pieces of equipment in a smart building.

The normalization method described herein penalizes false correlations caused by other factors but maintains true correlations by physical relationships between points and devices. The normalized correlations are then used to cluster the points to decide whether they belong to the same device or piece of equipment.

Exemplary Algorithm

Problem formulation: Given a set of variables, $V=\{v0, v1, \ldots, vk\}$, each of which has an associated time-series represented by a different point, and given a set of devices $D=\{d0, d1, \ldots, di\}$, the algorithm clusters together all the variables in V that belong to a same device from the set of devices D.

1. Detect events from timeseries data using an event detection method. A variety range of event detection methods can be used from a primitive method such as value changes to sophisticated Markovian event models. In some embodiments, a value change detection mechanism may be utilized to detect events. For example, the value change detection mechanism may identify when the value of a time series changes significantly (e.g., above a threshold) or by comparing the value to a moving average or other baseline. In some embodiments, a pattern recognition mechanism may be utilized to detect events. For example, a Machine Learning (ML) model may be trained to identify patterns in the time series data, such as repeating patterns or trends. In some embodiments, Markovian event models may be utilized to detect events. For example, using Markovian event models, events may be detected by analyzing the transition probabilities between different states in the system being observed. The transition probabilities are used to construct a Markovian model, which can then be used to predict the likelihood of future events based on the current state of the system. Markovian event models can be particularly useful for detecting events that have a predictable pattern of occurrence. In some embodiments, an event of the plurality of data points is indicative of an anomaly reading of one or more states associated with the plurality of data sources. In some embodiments, an event is indicative of a change that is above a pre-defined threshold.

It is advantageous to use a variety of event detection methods, ranging from primitive to sophisticated. One benefit is that it allows for flexibility in the event detection process. Different methods may work better for different types of data or in different contexts, so having a range of options available allows for the best method to be chosen for a particular situation. Additionally, even if the event detection method is not highly precise, the subsequent steps in the process (such as normalizing the correlation matrix) can suppress the effect of compounding factors, which means that a highly precise event detection method is not strictly necessary. This can make the event detection process more efficient and easier to implement.

2. Calculate a correlation matrix of the events across points. In some embodiments, the correlation matrix is calculated using statistical techniques such as Pearson's correlation coefficient or Spearman's rank correlation coefficient. These techniques may measure the linear relationship between two sets of data, and can be used to calculate the correlation between events across points. In some embodiments, the correlation matrix is calculated using ML techniques such as clustering or dimensionality reduction to identify patterns in the data and calculate the correlations between events. These techniques can be effective in identifying complex, non-linear relationships between events across points.

3. Normalize the correlation matrix to suppress compounding factors contributing to non-physical relations. Compounding factors contributing to non-physical relations in IoT devices may comprise external factors that affect the data being collected by the IoT devices, such as weather or other environmental conditions, or internal factors such as variations in the performance of the devices themselves. Other factors that may contribute to non-physical relations in IoT data may comprise differences in the way that data is collected or processed by different devices, or the presence of errors or noise in the data. By normalizing the correlation matrix, these compounding factors can be accounted for, allowing for the identification of more accurate and meaningful relationships between the points and devices. Various tools are utilized, such as utilizing metadata of the points and other mathematical tools.

i. Split the correlation matrix into submatrices. In each submatrix, all the elements of every row are of a same point type, and all the elements of every column are of a same point type. For example, one submatrix may contain the correlations between temperature points and humidity points, and another submatrix may contain the correlations between temperature points and pressure points, and so on. The rows of each submatrix contain values for one type of point (e.g., temperature), and the columns contain values for another type of point (e.g., humidity). This allows the correlations between different types of points to be analyzed separately.

ii. Normalize the rows and columns of each submatrix. For instance, and without loss of generality, the systems and methods described herein may subtract every element by a central tendency, i.e., the mean of its row or column; and divide by a measure of dispersion, i.e., the standard deviation of the same row or column. Normalizing the rows and columns helps to adjust for any differences in the scale or range of the values in the different rows and columns, and can make it easier to compare the relationships between the elements in the different rows and columns.

Example of Normalizing a Matrix and/or a Submatrix:

Suppose a submatrix with the following values:

|   | Point 1 | Point 2 | Point 3 |
|---|---------|---------|---------|
| 1 | 3       | 5       | 7       |
| 2 | 8       | 2       | 1       |
| 3 | 6       | 4       | 9       |

To normalize the rows, the systems and methods may subtract the mean of each row from each element in the row and divide by the standard deviation of the row. For example, for row 1, the systems and methods may do the following calculations:

Subtract the mean (5) from each element in the row: 3−5=−2, 5−5=0, 7−5=2

Divide each element by the standard deviation (2): (−2)/2=−1, 0/2=0, 2/2=1

The normalized row 1 would be [−1, 0, 1].

To normalize the columns, the systems and methods may subtract the mean of each column from each element in the column and divide by the standard deviation of the column. For example, for column 1, the systems and methods may do the following calculations:

Subtract the mean (5) from each element in the column: 3−5=−2, 8−5=3, 6−5=1

Divide each element by the standard deviation (2.45): (−2)/2.45=−0.82, 3/2.45=1.22, 1/2.45=0.41

The normalized column 1 would be [−0.82, 1.22, 0.41].

After normalizing both the rows and columns, the normalized submatrix would be:

|   | Point 1 | Point 2 | Point 3 |
|---|---------|---------|---------|
| 1 | −1      | 0       | 1       |
| 2 | 0.82    | −0.82   | −1.22   |
| 3 | −0.41   | 0.41    | 1.22    | iii. Once the submatrices of the correlation matrix are normalized, normalize the entire correlation matrix utilizing the same normalization method used in Step ii. Then, the systems and methods herein may apply min-max scaling to the elements of the matrix. In some embodiments, the systems and methods herein may identify the minimum and maximum values in the matrix, and for each element in the matrix, apply the following formula to scale its value: scaled_value=(value−min_value)/(max_value−min_value). The resulting values will be between 0 and 1, inclusive. If the systems and methods herein is configured to scale the values to a different range, such as −1 to 1, the formula may be adjusted accordingly, for example: scaled_value=(value−min_value)/(max_value−min_value)*(new_max−new_min)+new_min. In some embodiments, the scaling operation may alter the values of a matrix such that they are all in the range 0-1. In some embodiments, the min-max scaling may scale the elements of the matrix such that the values be in the range −1 to 1. Other range may be selected in different embodiments to fulfill the scaling operation.

iv. Fill with zeroes any correlations in the matrix that can't possibly represent a relationship between two points. The goal is to remove false correlations between points that are unlikely to belong to the same device. In some embodiments, this is accomplished by setting the corresponding entries in the adjacency matrix C to 0. For example, if two points are discharge air temperature sensors, and it is known that discharge air temperature sensors are not likely to belong to the same device (e.g., a VAV), then the corresponding entry in C can be set to 0. This helps to remove false correlations and improve the accuracy of the clustering process. In some embodiments, to identify the entries that should be set to 0 (i.e., to identify the points that are unlikely to belong to the same device), the systems and methods described herein may utilize metadata. For example, if the metadata for a particular point includes information about the type of sensor that it is (e.g., temperature sensor, humidity sensor, etc.), then this information can be used to determine whether two points are likely to belong to the same device. If the two points are of the same type, and it is known that one device may only have one sensor monitors this type of data, then it is unlikely that they belong to the same device and C can be filled with a zero in the corresponding element. In some embodiments, other techniques for determining whether two points are likely to belong to the same device might include analyzing the location of the points within the building (e.g., if they are located in different rooms or on different floors, they are less likely to belong to the same device), or analyzing the relationship between the points (e.g., if one point is a temperature sensor and the other is a humidity sensor, they are more likely to belong to the same device).

4. Cluster the points based on the correlations. Various clustering methods can be used, for example:
   i. Find the shortest path between each pair of points; and
   ii. Cluster the points based on the paths, and each cluster represents points belonging to the same device.

To perform this clustering, the systems and methods herein may first find the shortest path between each pair of points in the dataset. In some embodiments, the shortest path is determined using a graph-based approach, such as Dck-ijkstra's algorithm or Floyd-Warshall algorithm. For example, using Dijkstra's algorithm which is a graph search algorithm, the systems and methods herein may solve the single-source shortest path problem for a graph with non-negative edge weights, producing a shortest path tree. In another example, using Floyd-Warshall algorithm, the systems and methods herein may find the shortest paths in a weighted graph with positive or negative edge weights. Once the shortest paths have been calculated, the points can be clustered based on these paths. In some embodiments, any points that are connected by a shortest path are considered to belong to the same cluster, or to be part of the same device. In some embodiments, to cluster the points based on the shortest paths, the systems and methods described herein may utilize a graph-based clustering algorithm such as the single-linkage method or the complete-linkage method. The single-linkage method starts by considering each point as its own cluster, and then iteratively combines the two closest clusters until there is only one cluster left. To find the distance between two clusters, the single-linkage method uses the shortest distance between any two points in the two clusters. The complete-linkage method also starts by considering each point as its own cluster, but it iteratively combines the two farthest clusters until there is only one cluster left. To find the distance between two clusters, the complete-linkage method uses the longest distance between any two points in the two clusters. To apply either of these methods, the systems and methods herein may use the shortest paths between points as the distances between clusters. For example, the systems and methods can iteratively combine the clusters based on the distance between them until there is only one cluster left. This cluster will contain all the points that are connected by a shortest path, and can be considered to belong to the same device. This approach can be useful for identifying groups of points that are related to each other and likely to belong to the same device, even if they are not strongly correlated with each other.

One use case for the above method for clustering data points based on correlations could be in the context of a smart building with multiple rooms. In this case, the data points may represent temperature and humidity sensors located in different rooms within the building. The event detection method could be used to identify significant changes in the temperature and humidity data over time, and the correlation matrix could be calculated based on these events. The normalization steps could be used to remove any false correlations that may be caused by factors such as the time of day or the overall weather conditions, and the resulting matrix could be used to cluster the temperature and humidity sensors into groups that likely belong to the same room or device. The identified clusters may then be used to more accurately control the heating and cooling systems within the building, based on the real-time data from the sensors.

Exemplary Implementation

Given a set of variables, $V=\{v0, v1, \ldots, vk\}$, each of which has an associated time-series represented by a different point, and given a set of devices $D=\{d0, d1, \ldots, di\}$, the algorithm clusters together all the variables in V that belong to a same device from the set of devices D.

The algorithm, in various embodiments, works as follows:

1. Find events in the time-series data of each variable in V. In some embodiments, "event" is defined as a change in the value of a time-series at any given time that is higher than a given threshold. For example, an event in this context may be a change in the temperature of a room. If the threshold of temperature change in the room is set to be whenever the temperature changes by more than 2 degrees Celsius, then an event might be detected if the temperature goes from 20 to 22 degrees or from 30 to 28 degrees. In some embodiments, other examples of events might include a change in the humidity level, a change in the amount of light in a room, or a change in the occupancy of a room as detected by a motion sensor. In some embodiments, the presence of each event is marked as 1, and the lack of an event as 0. As a result, each time-series variable is transformed into a binary variable or a sequence of events. As described herein elsewhere, various algorithms can be used to identify events, such as moving averages.

2. Calculate the correlation matrix, C, among all the resulting binary variables in the event space, and fill the main diagonal of correlation matrix C with zeroes. In some embodiments, the correlation matric C is calculated using statistical techniques such as Pearson's correlation coefficient or Spearman's rank correlation coefficient. For example, the covariance of two variables may be divided by the product of their standard deviations. The resulting coefficient will be between −1 and 1, where −1 indicates a strong negative correlation, 1 indicates a strong positive correlation, and 0 indicates no correlation. In some embodiments, the elements on the diagonal are set to be 0. This is because a variable is perfectly correlated with itself, so the value on the diagonal would be 1, which would distort the normalization process. By setting the diagonal to 0, the systems and methods described herein can avoid this issue.

3. The process for identifying points that are linked to the same device is visualized in a graph, where points are connected to each other with a certain weight or correlation. Therefore, the correlation matrix C is re-defined as the weighted adjacency matrix of this graph. In some embodiments, the adjacency matrix of a graph is a square matrix that represents the connections between the vertices (points) in the graph. In some embodiments, if there is an edge connecting two vertices, the corresponding entry in the adjacency matrix is set to 1; if there is no edge connecting two vertices, the corresponding entry is set to 0. In some embodiments, the weight of the edge can be represented by assigning a value to the entry in the matrix. For example, if vertex A is connected to vertex B with an edge of weight 5, the entry in the adjacency matrix at the intersection of row A and column B would be set to 5. This matrix can be used to represent the relationships between the points in the graph, and can be useful for analyzing the structure of the graph and finding patterns within it.

4. Fill correlation matrix C with zeroes wherever two points are unlikely to belong to the same device. The goal is to remove false correlations between points that are unlikely to belong to the same device. In some embodiments, this is accomplished by setting the corresponding entries in the adjacency matrix C to 0. For example, if two points are discharge air temperature sensors, and it is known that discharge air temperature sensors are not likely to belong to the same device (e.g., a VAV), then the corresponding entry in C can be set to 0. This helps to remove false correlations and improve the accuracy of the clustering process. In some embodiments, to identify the entries that should be set to 0 (i.e., to identify the points that are unlikely to belong to the same device), the systems and methods described herein may utilize metadata. For example, if the metadata for a particular point includes information about the type of sensor that it is (e.g., temperature sensor, humidity sensor, etc.), then this information can be used to determine whether two points are likely to belong to the same device. If the two points are of the same type, and it is known that one device may only have one sensor monitors this type of data, then it is unlikely that they belong to the same device and C can be filled with a zero in the corresponding element. In some embodiments, other techniques for determining whether two points are likely to belong to the same device might include analyzing the location of the points within the building (e.g., if they are located in different rooms or on different floors, they are less likely to belong to the same device), or analyzing the relationship between the points (e.g., if one point is a temperature sensor and the other is a humidity sensor, they are more likely to belong to the same device).

5. Variables in V can be represented by different types of points (i.e. discharge air temperature sensor, supply fan speed). In some embodiments, the "point link type" is defined as the relation between two point types, pt_type_1 and pt_type_2, which can both be of the same type (pt_type_1=pt_type_2). Following this definition, the correlation matrix C may be split into multiple submatrices, each of which has a different point link type. The rows of each submatrix belong to pt_type_1, and the columns to pt_type_2. For example, one submatrix might represent the correlations between all the temperature sensors in the building, while another might represent the correlations between all the humidity sensors.

6. For each submatrix in C, apply the following matrix link-type normalization:
  a. Normalize every row by subtracting the mean of the row to all the values and dividing them by their standard deviation. The resulting matrix is referred to as N1.
  b. Normalize every column by subtracting the mean of the column to all the values and dividing them by their standard deviation. The resulting matrix is referred to as N2.
  c. Compute the bitwise average of N1 and N2: N=(N1+N2)/2.

For example, consider a submatrix C that represents the correlations between variables of point type "temperature sensor" and point type "humidity sensor." The rows of this submatrix represent the temperature sensors, and the columns represent the humidity sensors. The normalization process would first normalize the rows of C, resulting in a matrix N1 where each row has a mean of 0 and a standard deviation of 1. The normalization process would then normalize the columns of C, resulting in a matrix N2 where each column has a mean of 0 and a standard deviation of 1. Finally, the bitwise average of N1 and N2 is taken, resulting in a matrix N where the values represent the normalized correlations between temperature sensors and humidity sensors. This normalization process helps to remove biases and other factors that may affect the correlations, allowing for a more accurate representation of the relationships between the variables.

7. Combine the submatrices normalized in step 6 to obtain a new matrix C that will be normalized by link types.

8. Fill the main diagonal with zeroes.

9. Normalize C:
  a. Normalize the values of every row by subtracting the mean of the row and dividing by its standard deviation. This resulting matrix is referred as N1. In some embodiments, even though C is a symmetric matrix, N1 is not.
  b. Compute the bitwise average of N1 with its transpose to obtain a symmetric and normalized matrix C: C=(N1+N1')/2

10. Apply matrix min-max normalization: normalize all the values of the matrix between 0 and 1 using the minimum and maximum values of the matrix.

11. Fill the main diagonal with zeroes. The goal is to remove false correlations between points that are unlikely to belong to the same device. In some embodiments, this is accomplished by setting the corresponding entries in the adjacency matrix C to 0. For example, if two points are discharge air temperature sensors, and it is known that discharge air temperature sensors are not likely to belong to the same device (e.g., a VAV), then the corresponding entry in C can be set to 0. This helps to remove false correlations and improve the accuracy of the clustering process. In some embodiments, to identify the entries that should be set to 0 (i.e., to identify the points that are unlikely to belong to the same device), the systems and methods described herein may utilize metadata. For example, if the metadata for a particular point includes information about the type of sensor that it is (e.g., temperature sensor, humidity sensor, etc.), then this information can be used to determine whether two points are likely to belong to the same device. If the two points are of the same type, and it is known that one device may only have one sensor monitors this type of data, then it is unlikely that they belong to the same device and C can be filled with a zero in the corresponding element. In some embodiments, other techniques for determining whether two points are likely to belong to the same device might include analyzing the location of the points within the building (e.g., if they are located in different rooms or on different floors, they are less likely to belong to the same device), or analyzing the relationship between the points (e.g., if one point is a temperature sensor and the other is a humidity sensor, they are more likely to belong to the same device).

12. Apply shortest path algorithm to the matrix to obtain a shortest path matrix. For example, the Floyd-Warshall algorithm is optionally utilized to perform this task. In some embodiments, the systems and methods herein may first find the shortest path between each pair of points in the dataset. In some embodiments, the shortest path is determined using a graph-based approach, such as Dijkstra's algorithm or Floyd-Warshall algorithm. For example, using Dijkstra's algorithm which is a graph search algorithm, the systems and methods herein may solve the single-source shortest path problem for a graph with non-negative edge weights, producing a shortest path tree. In another example, using Floyd-Warshall algorithm, the systems and methods herein may find the shortest paths in a weighted graph with positive or negative edge weights. Once the shortest paths have been calculated, the points can be clustered based on these paths. In some embodiments, any points that are connected by a shortest path are considered to belong to the same cluster, or to be part of the same device. In some embodiments, to cluster the points based on the shortest paths, the systems and methods described herein may utilize a graph-based clustering algorithm such as the single-linkage method or the complete-linkage method. The single-linkage method starts by considering each point as its own cluster, and then iteratively combines the two closest clusters until there is only one cluster left. To find the distance between two clusters, the single-linkage method uses the shortest distance between any two points in the two clusters. The complete-linkage method also starts by considering each point as its own cluster, but it iteratively combines the two farthest clusters until there is only one cluster left. To find the distance between two clusters, the complete-linkage method uses the longest distance between any two points in the two clusters. To apply either of these methods, the systems and methods herein may use the shortest paths between points as the distances between clusters. For example, the systems and methods can iteratively combine the clusters based on the distance between them until there is only one cluster left. This cluster will contain all the points that are connected by a shortest path, and can be considered to belong to the same device. This approach can be useful for identifying groups of points that are related to each other and likely to belong to the same device, even if they are not strongly correlated with each other.

13. Fill the main diagonal with zeroes.

14. Make multiple clusters from the resulting weighted graph, G, which is represented by the resulting adjacency matrix C. Each clustered graph will be made of points associated to the same device.

Importantly, in this example, steps 4 through 13 are optionally performed in different orders or combinations with repetition. Moreover, any step is optionally repeated multiple times.

Figure 2:
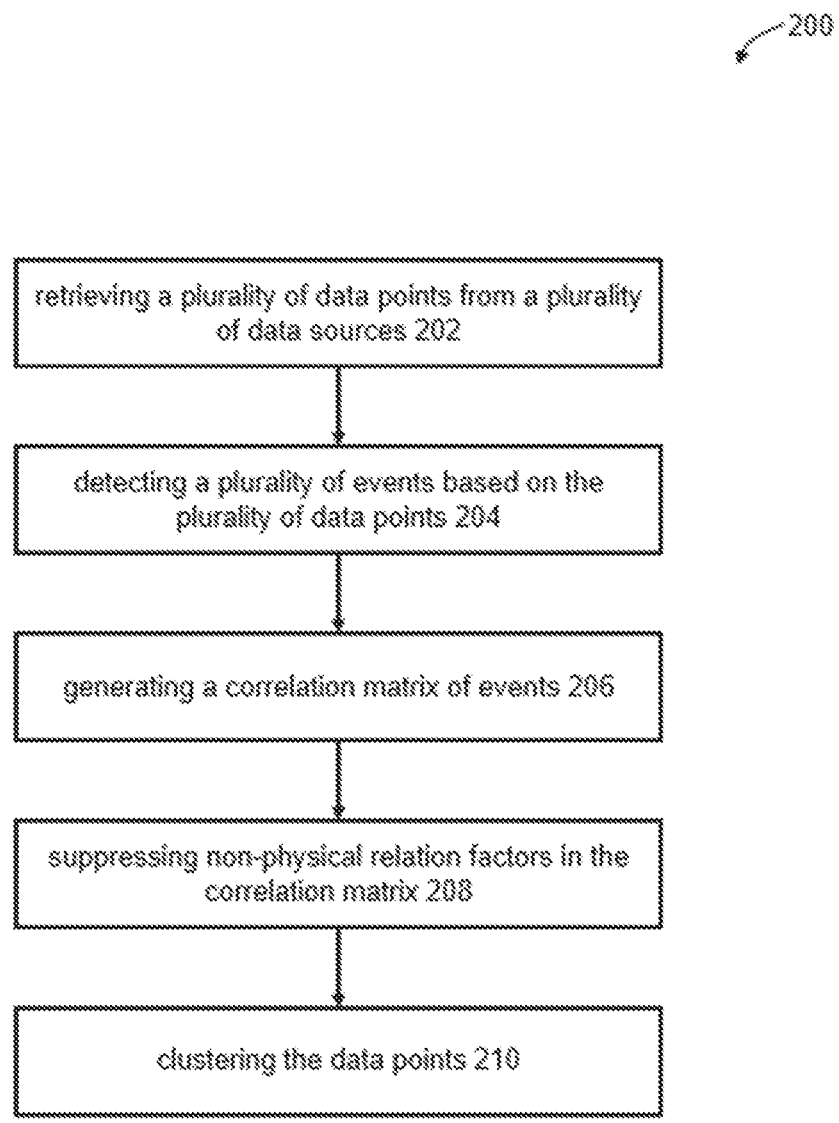
FIG. 2 shows a non-limiting example of a process for clustering data points, in accordance with embodiments described herein.

FIG. 2 shows a non-limiting example of a process 200 for clustering data points, in accordance with embodiments described herein. The process 200 may begin with operation 202, wherein the system may retrieve data points from a plurality of data sources associated with an automated environment. In some embodiments, the data points may be in timeseries data structure. In some embodiments, the data points may comprise a plurality of metadata. In some embodiments, the system may parse the received data sets for metadata.

Next, the process 200 may proceed to operation 204, wherein the system may detect events based on the retrieved data points. In some embodiments, a value change detection mechanism may be utilized to detect events. For example, the value change detection mechanism may identify when the value of a time series changes significantly (e.g., above a threshold) or by comparing the value to a moving average or other baseline. In some embodiments, a pattern recognition mechanism may be utilized to detect events. For example, a Machine Learning (ML) model may be trained to identify patterns in the time series data, such as repeating patterns or trends. In some examples, the system may use a machine learning model to identify patterns in time series data for event detection in IoT devices by monitoring of energy consumption in smart homes. The time series data collected by IoT devices in the home, such as energy usage by appliances and HVAC systems, can be used to train a machine learning model to identify patterns and trends in the data. By analyzing the data over time, the model can learn to predict when energy usage is likely to increase or decrease, and can flag any deviations from the expected pattern as potential events. For example, if the model predicts that the energy usage for a particular appliance should be low at a certain time of day, but the actual usage is significantly higher, this deviation could be flagged as an event and further investigated. This approach can help identify events in the timeseries data.

In some embodiments, Markovian event models may be utilized to detect events. For example, using Markovian event models, events may be detected by analyzing the transition probabilities between different states in the system being observed. The transition probabilities are used to construct a Markovian model, which can then be used to predict the likelihood of future events based on the current state of the system. Markovian event models can be particularly useful for detecting events that have a predictable pattern of occurrence. In some embodiments, an event of the plurality of data points is indicative of an anomaly reading of one or more states associated with the plurality of data sources. In some embodiments, an event is indicative of a change that is above a pre-defined threshold.

Next, the process 200 may proceed to operation 206, wherein the system may generate a correlation matrix of the events. In some embodiments, the system may, using the identified the events in the data, utilize statistical techniques such as Pearson's or Spearman's correlation coefficient to calculate a correlation matrix of the events across the different devices. This matrix may be indicative of the relationships between the events at different devices. In some embodiments, to calculate the correlation matrix using Pearson's correlation coefficient, the systems of methods described herein may retrieve two sets of data for each pair of devices for comparison. In some embodiments, the system may then calculate the covariance between the two sets of data, and divide it by the product of their standard deviations. This may result the Pearson's correlation coefficient for that pair of devices. In some embodiments, this process may be repeated for all pairs of devices, and the coefficients may be used to populate the correlation matrix.

Next, the process 200 may proceed to operation 208, wherein the system may suppress non-physical relation factors in the correlation matrix. As discussed herein elsewhere, there may be non-physical relations in the data that are not relevant to whether the points belong to the same device or not, and thus these relations may interfere with the analysis. For example, external factors such as weather or environmental conditions may affect the data being collected by the IoT devices and could cause false correlations between events at different devices. In another example, the data representing the same type of data (e.g., temperature data, humidity data, etc.) may appear to be very similar to each other, such as data from two temperature sensors; however, this similarity does not indicate that the two data points belong to a same device. To the contrary, it is quite likely that they do not belong to the same device. By suppressing these non-physical relations, the systems and methods herein may focus on the relationships that are relevant to identifying data points belong to same device and improve the accuracy of our analysis.

In some embodiments, the system may suppress non-physical relation factors by normalizing the correlation matrix. For example, the system may subtract a measure of central tendency (e.g. mean or median) from each data point, and divide the resulting values by a measure of dispersion (e.g. standard deviation). The process for normalizing the correlation matrix is described in detail elsewhere herein.

In some embodiments, the system may utilize other mechanisms to suppress non-physical relation factors. For example, the system may perform data transformation to the data, or may perform dimensionality reduction to the data.

Next, the process 200 may proceed to operation 210, wherein system may cluster the data points based on the normalized matrix. In some embodiments, the clustered data points may represent the data points belong to a same data source. Various clustering methods can be used, for example, shortest path mechanism. To perform this clustering, the systems and methods herein may first find the shortest path between each pair of points in the dataset. In some embodiments, the shortest path is determined using a graph-based approach, such as Dijkstra's algorithm or Floyd-Warshall algorithm. For example, using Dijkstra's algorithm which is a graph search algorithm, the systems and methods herein may solve the single-source shortest path problem for a graph with non-negative edge weights, producing a shortest path tree. In another example, using Floyd-Warshall algorithm, the systems and methods herein may find the shortest paths in a weighted graph with positive or negative edge weights. Once the shortest paths have been calculated, the points can be clustered based on these paths. In some embodiments, any points that are connected by a shortest path are considered to belong to the same cluster, or to be part of the same device. In some embodiments, to cluster the points based on the shortest paths, the systems and methods described herein may utilize a graph-based clustering algorithm such as the single-linkage method or the complete-linkage method. The single-linkage method starts by considering each point as its own cluster, and then iteratively combines the two closest clusters until there is only one cluster left. To find the distance between two clusters, the single-linkage method uses the shortest distance between any two points in the two clusters. The complete-linkage method also starts by considering each point as its own cluster, but it iteratively combines the two farthest clusters until there is only one cluster left. To find the distance between two clusters, the complete-linkage method uses the longest distance between any two points in the two clusters. To apply either of these methods, the systems and methods herein may use the shortest paths between points as the distances between clusters. For example, the systems and methods can iteratively combine the clusters based on the distance between them until there is only one cluster left. This cluster will contain all the points that are connected by a shortest path, and can be considered to belong to the same device. This approach can be useful for identifying groups of points that are related to each other and likely to belong to the same device, even if they are not strongly correlated with each other.

Figure 3:
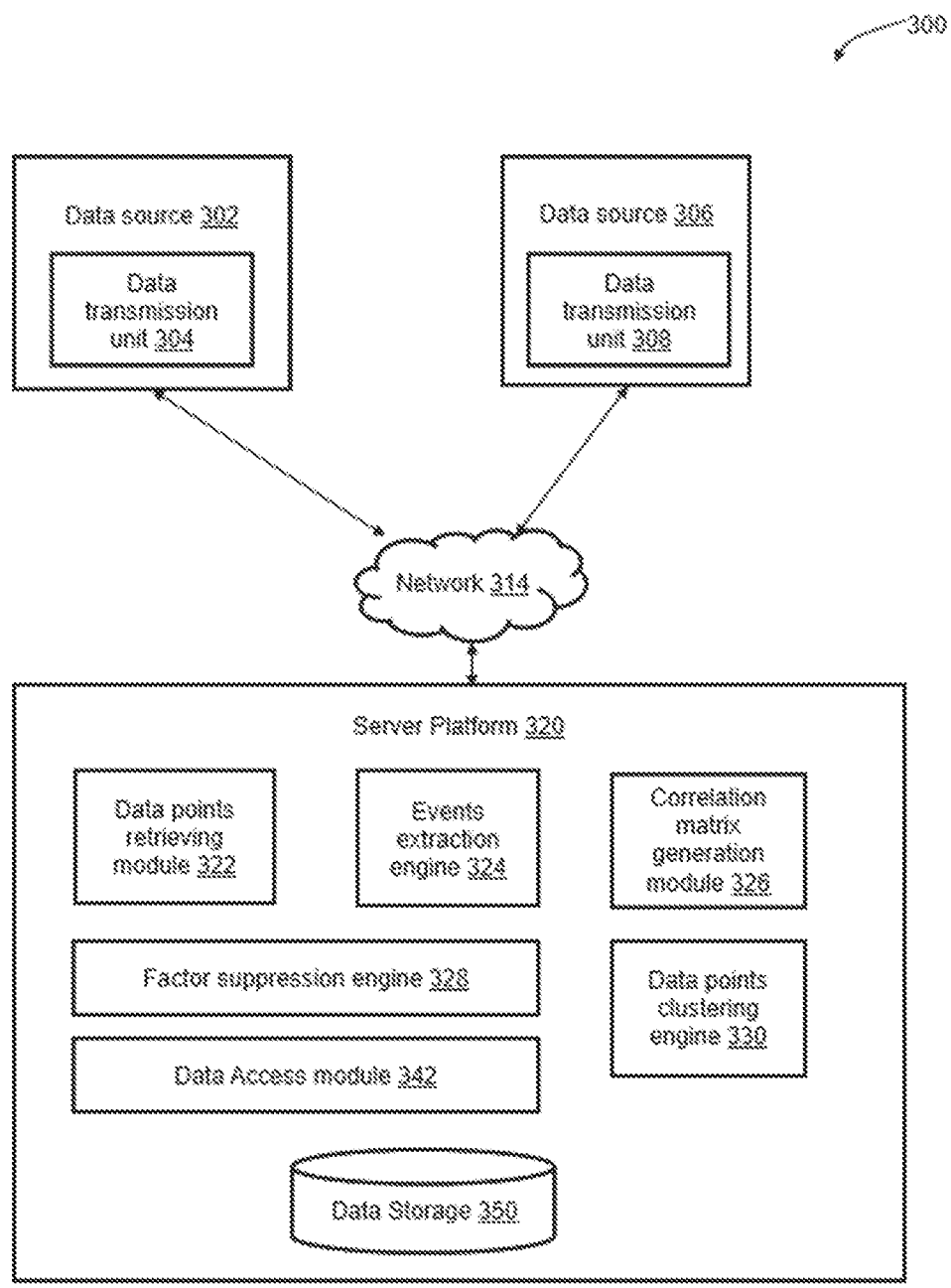
FIG. 3 illustrates a block diagram depicting an example system, according to embodiments of the present disclosure, comprising an architecture configured to perform various methods described herein.

FIG. 3 illustrates a block diagram depicting an example system 300, according to embodiments of the present disclosure. A platform (e.g., machines and software, possibly interoperating via a series of network connections, protocols, application-level interfaces, and so on), in the form of a server platform 320, provides server-side functionality via a communication network 314 (e.g., the Internet or other types of wide-area networks (WANs), such as wireless networks or private networks with additional security appropriate to tasks performed by a user) to one or more data sources 302 and/or 306. The data sources 302 and/or 306 may host data transmission units 304 and/or 308 to transmit data points to the server platform 320 for further analysis. In some embodiments, the data sources 302 and/or 306 may comprise IoT devices, or any other sensors associated with the automated environment. As described herein elsewhere, the variables obtained from those sensors, actuators, or parameters are referred to as "points," or "data points", which are linked to different devices or pieces of equipment. The value of a point at a certain time represents the current status of the point, i.e., the status of a device's operation or a physical phenomenon of an environment at that time. A time-series data is a series of such values and may represent events associated with related points or devices. In some embodiments, data transmission units 304 and/or 308 may transmit data points be through a wired or wireless mode of communication.

In at least some examples, the server platform 320 may be one or more computing devices or systems, storage devices, and other components that include, or facilitate the operation of, various execution modules depicted in FIG. 3. These modules may include, for example, a data points retrieving module 322, an evens extraction engine 324, a correlation matrix generation module 326, a factor suppression engine 328, a data point clustering engine 330, a data access module 342, and a data storage 350. Each of these modules is described in greater detail below.

The data points retrieving module 322 may receive data points from one or more data sources 302 and/or 306. In some embodiments, the data points may be in a form of timeseries data, wherein the value of the data may be associated with time stamps. In some embodiments, the data points may be transmitted to the events extraction engine 324 to extract and/or detect events from the timeseries data. In some embodiments, the events extraction engine 324 may utilize a variety range of event detection methods from a primitive method such as value changes to sophisticated Markovian event models to extract events. In some embodiments, a value change detection mechanism may be utilized by the events extraction engine 324 to detect events. For example, the value change detection mechanism may identify when the value of a time series changes significantly (e.g., above a threshold) or by comparing the value to a moving average or other baseline. In some embodiments, a pattern recognition mechanism may be utilized by the events extraction engine 324 to detect events. For example, a Machine Learning (ML) model may be trained to identify patterns in the time series data, such as repeating patterns or trends. In some embodiments, Markovian event models may be utilized to detect events. For example, using Markovian event models, events may be detected by analyzing the transition probabilities between different states in the system being observed. The transition probabilities are used to construct a Markovian model, which can then be used to predict the likelihood of future events based on the current state of the system. Markovian event models can be particularly useful for detecting events that have a predictable pattern of occurrence. In some embodiments, an event of the plurality of data points is indicative of an anomaly reading of one or more states associated with the plurality of data sources. In some embodiments, an event is indicative of a change that is above a pre-defined threshold. In some embodiments, the correlation matrix generation module 326 may generate matrix of the events across data points. In some embodiments, the correlation matrix generation module 326 may calculate the correlation matrix using statistical techniques such as Pearson's correlation coefficient or Spearman's rank correlation coefficient. These techniques may measure the linear relationship between two sets of data, and can be used by the correlation matrix generation module 326 to calculate the correlation between events across points. In some embodiments, the correlation matrix generation module 326 may comprise a ML module, and the correlation matrix is calculated using ML techniques such as clustering or dimensionality reduction to identify patterns in the data and calculate the correlations between events. These techniques can be effective in identifying complex, non-linear relationships between events across points.

In some embodiments, the factor suppression engine 328 may suppress compounding factors contributing to non-physical relations of the correlation matrix. In some embodiment, noticing that compounding factors may contribute to non-physical relations in IoT devices may comprise external factors that affect the data being collected by the IoT devices, such as weather or other environmental conditions, or internal factors such as variations in the performance of the devices themselves, these factors may be suppressed to generate a less noisy data set to identify data points associated with the same device (i.e., data source, IoT devices). Other factors that may contribute to non-physical relations in IoT data may comprise differences in the way that data is collected or processed by different devices, or the presence of errors or noise in the data. In some embodiments, the factor suppression engine 328 may normalize the correlation matrix to account for the compounding factors to allow for the identification of more accurate and meaningful relationships between the points and devices. Detailed operations of the factor suppression engine 328 is described herein elsewhere. The factor suppression engine 328 may generate a normalized matrix from the correlation matrix.

The data points clustering engine 330 may cluster the data points based on the normalized matrix. In some embodiments, data points clustering engine 330 may identify the shortest path using a graph-based approach, such as Dck-ijkstra's algorithm or Floyd-Warshall algorithm. For example, using Dijkstra's algorithm which is a graph search algorithm, the data points clustering engine 330 may solve the single-source shortest path problem for a graph with non-negative edge weights, producing a shortest path tree. In another example, using Floyd-Warshall algorithm, the data points clustering engine 330 may find the shortest paths in a weighted graph with positive or negative edge weights. Once the shortest paths have been calculated, the points can be clustered based on these paths. In some embodiments, any points that are connected by a shortest path are considered to belong to the same cluster, or to be part of the same device. In some embodiments, to cluster the points based on the shortest paths, the data points clustering engine 330 may utilize a graph-based clustering algorithm such as the single-linkage method or the complete-linkage method. The single-linkage method starts by considering each point as its own cluster, and then iteratively combines the two closest clusters until there is only one cluster left. To find the distance between two clusters, the data points clustering engine 330 may utilize the single-linkage method that uses the shortest distance between any two points in the two clusters. The complete-linkage method also starts by considering each point as its own cluster, but it iteratively combines the two farthest clusters until there is only one cluster left. To find the distance between two clusters, the complete-linkage method uses the longest distance between any two points in the two clusters. To apply either of these methods, the data points clustering engine 330 may use the shortest paths between points as the distances between clusters. For example, the data points clustering engine 330 may iteratively combine the clusters based on the distance between them until there is only one cluster left. This cluster will contain all the points that are connected by a shortest path, and can be considered to belong to the same device. This approach can be useful for identifying groups of points that are related to each other and likely to belong to the same device, even if they are not strongly correlated with each other.

Data access modules 342 may facilitate access to data storage 350 of the server platform 320 by any of the remaining modules 322, 324, 326, 328, and 330 of the server platform 320. In one example, one or more of the data access modules 342 may be database access modules, or may be any kind of data access module capable of storing data to, and/or retrieving data from, the data storage 350 according to the needs of the particular modules 322, 324, 326, 328, and 330 employing the data access modules 342 to access the data storage 350. Examples of the data storage 350 include, but are not limited to, one or more data storage components, such as magnetic disk drives, optical disk drives, solid state disk (SSD) drives, and other forms of nonvolatile and volatile memory components.

Automation Environment

In some embodiments, the platforms, systems, and methods described herein are implemented in relation to an automation environment. In further embodiments, the automation environment comprises electronically controllable equipment with one or more sensors, one or more actuators, and/or one or more effectors, as well as one or more automation controllers—either centralized and/or distributed. As this environment is the target of the logic and functionality described herein, the environment, in some cases, exists before the platforms, systems, and methods described herein are applied to it. In other cases, the environment is implemented with, e.g., proximate in time to, the platforms, systems, and methods described herein.

Many automation environments are suitable, including, by way of non-limiting examples, industrial environments, such as manufacturing environments and assembly environments, infrastructure, transportation, freight or shipping environments, smart cities, agricultural environments, military environments, law enforcement environments, commercial environments, such as smart building environments, smart office environments, healthcare environments, and retail environments, as well as residential environments, such as smart home environments, and the like. In some embodiments, the automation environments include cloud storage and/or computing system.

In various embodiments, the electronically controllable equipment comprises, by way of non-limiting examples, a smart manufacturing device (e.g., a robot, manufacturing actuator, assembly line sensor, etc.), a utility device (e.g., a water meter, transformer, gas meter, etc.), pipeline monitoring device, power plant monitoring device, electrical grid monitoring device, an environmental sensor (e.g., a carbon dioxide sensor, pollution detector, salinity meter, light meter, etc.), a weather sensor (e.g., humidity sensor, temperature sensor, rain gauge, anemometer, barometer, etc.), a transportation asset (e.g., a car, truck, watercraft, train, bus, aircraft, unmanned vehicle, GPS receiver, etc.), a freight or shipping asset (e.g., a shipping container, cargo, truck, rail car, watercraft, aircraft, etc.), a smart city device (e.g., a parking meter, utility meter, lighting device, traffic monitoring camera, emergency calling device, etc.), an agriculture device (e.g., a farming machine, soil sensor, irrigation device, etc.), a homeland security device (e.g., a body scanner, metal detector, radiation detector, biological agent detector, weapon, vehicle, drone, perimeter intrusion detector, gunfire locator, breathalyzer, etc.), a smart office device (e.g., an access control device, security system, HVAC system, vertical lifts, fire safety system, lighting system, printer, coffee maker, etc.), a point-of-sale (PoS) system (e.g., a payment device, receipt printer, barcode or QR code scanner, etc.), a health care device (e.g., a drug infusion pump, pacemaker, defibrillator, patient health monitoring device, etc.), as well as a smart home device (e.g., a security system, door lock, lighting device, appliance, thermostat, smoke detector, virtual assistant, smart speaker, etc.), and the like.

Data Sources

As described herein, in some embodiments, the automation environment comprises one or more pieces of electronically controllable equipment. In further embodiments, the electronically controllable equipment further comprises one or more of the following components: a microcontroller (MCU), a microprocessor (MPU), a memory or storage component, firmware, software, a networking/communications component, a sensing component (e.g., a sensor), an electronic circuit connected to the sensing component, an actuating component (e.g., an actuator and/or an effector), an electronic circuit connected to the actuating component, and an energy source. In some embodiments, one or more of the components are physically separate from a piece of electronically controllable equipment. In some embodiments, one or more of the components are integrated with, or embedded in, a piece of electronically controllable equipment.

In some embodiments, the automation environment comprises one or more cloud storage and/or computing systems, which in some cases are located remotely from the data integration pipeline. For example, some devices (e.g., pieces of electronically controllable equipment) are configured to communicate with a cloud storage and/or computing system. In these embodiments, the data integration pipeline discovers and/or extracts data from cloud APIs. In some embodiments, the data integration pipeline processes data both from on-premise systems and cloud systems.

In some embodiments, the networking/communication element includes a receiver, a transmitter, and/or a transceiver. In further embodiments, the networking/communication element comprises a radio frequency (RF) transceiver with an antenna or connection for an external antenna. Suitable transceivers include, by way of non-limiting examples, a Wi-Fi transceiver, a cellular transceiver, a Bluetooth transceiver, and the like.

In some embodiments, the electronically controllable equipment, or components thereof, comprises an IP address for internet connectivity. In further embodiments, the equipment may be associated with a MAC address or an SSID. It is understood that equipment may connect with other devices through wired or wireless connections, which allow for transfer (e.g., transmission, reception, or both) of data.

In some embodiments, the automation environment comprises one or more networks via which the electronically controllable equipment, or components thereof, sends and/or receives data. In various embodiments, the network comprises ethernet, IP, serial buses, and other forms of communication between two or more IoT devices. In further embodiments, the one or more networks comprise one or more IoT networks, one or more data packet-switched networks, one or more wireless sensor networks (WSN), and/or one or more wireless sensor and actuator networks (WSAN). In various embodiments, a network described herein is wireless network utilizing Wi-Fi, WiMAX, ZigBee, Z-Wave, Bluetooth, Bluetooth Low Energy (BLE), Near-Field Communication (NFC), or Light-Fidelity (Li-Fi). In some embodiments, a network described herein is wireless network utilizing LTE or 5G. In some embodiments, a network described herein is wireless network utilizing a low-power wide-area network (LPWAN) protocol, such as LoRa. In other embodiments, a network described herein is wired network utilizing Ethernet, serial, RS422 or RS485 serial bus, 1-Wire, CAN, DMX, or power line communication.

In some embodiments, one or more devices form nodes in the network. In some embodiments, a network described herein includes a central node for controlling the network. In some embodiments, the automation environment comprises electronically controllable equipment, or components there, that have hierarchical relationships, such as a controller/controlled relationship, a master/slave relationship, or the like. In some embodiments, a network described herein has a distributed architecture to reduce the impact of a failed device or node. In some embodiments, a network described herein consists of a peer-to-peer relationship between two or more devices.

The automation environment suitably comprises a wide range of numbers of data sources, including, by way of examples, pieces of electronically controllable equipment, local and remote data stores, and remote cloud computing services/resources, including APIs to provide data from remote computing services/resources. In various embodiments, the automation environment suitably comprises, by way of non-limiting examples, at least 5, at least 10, at least 50, at least 100, at least 500, at least 1,000, at least 5,000, at least 10,000, at least 50,000, or at least 100,000 data sources, including increments therein. In various further embodiments, the automation environment suitably comprises, by way of non-limiting examples, at least 500,000, at least 1,000,000, at least 5,000,000, at least 10,000,000, at least 50,000,000, at least 100,000,000, or at least 500,000,000 data sources, including increments therein.

In some embodiments, the automation environment comprises an automation controller, either centralized or distributed. For example, in some embodiments, the automation environment comprises one or more programmable logic controllers (PLC). A PLC is a microprocessor-based controller with programmable memory used to store program instructions and functions. In some embodiments, one or more of the PLCs are ruggedized. In various embodiments, a PLC comprises a processor unit (MCU or the MPU) which interprets inputs, executes the control program stored in memory, and sends output signals, a power supply unit which, in some cases, converts AC voltage to DC, a memory unit storing data from inputs and program instructions to be executed by the processor unit, an input and output interface, by which the PLC sends data to external devices and receives data from external devices, and a communications interface to receive and transmit data on communication networks. In further embodiments, a PLC comprises a real-time operating system, such as OS-9, Sedona, Niagara, or VxWorks. In various embodiments, PLC functionality includes, by way of examples, sequential relay control, motion control, process control, distributed control systems, and networking. In particular embodiments, a PLC is programmed with a device used to develop and later download a program into the memory of the PLC. The programming device, in various cases, includes a desktop console, special software on a personal computer, or a handheld programming device. In some cases, the program is downloaded to the PLC directly or over a network and stored either in non-volatile flash memory or battery-backed-up RAM.

In some embodiments, the MCU or the MPU receives data from a sensing component and transmits the data to the transmitter or transceiver to be transmitted to other remotely located elements within a network. In some embodiments, the receiver or transceiver receives data, for example, control data from remotely located devices, and such data gets relayed to the MCU or the MPU to generate commands to one or more other components. In such embodiments, a sensing component and/or an actuation component performs one or more functions(s) based on the received command. In some embodiments, an electrical circuit is utilized in data transfer among a sensing component, an actuation component, the MCU or MPU, and the networking/communications element.

Many sensors are suitable including, by way of non-limiting examples, GPS receivers, wearable sensors, mobile sensors, fixed sensors, and the like. In various embodiments, the electronically controllable equipment, or components thereof, and/or networks described herein comprise one or more of: an audio/acoustic sensor, a breathalyzer, a temperature sensor, a carbon dioxide sensor, a carbon monoxide sensor, an infrared sensor, an oxygen sensor, an ozone monitor, a pH sensor, a smoke detector, an electrical current sensor, an electrical voltage detector, a magnetometer, a metal detector, a radio direction finder, an air flow meter, an anemometer, a flow sensor, a gas meter, a water meter, a Geiger counter, an altimeter, an air speed indicator, a depth gauge, a gyroscope, a compass, an odometer, a shock detector, a barometer, a pressure gauge, a thermometer, a proximity sensor, a motion detector, an occupancy sensor, an inertial sensor, a gyroscope, or any combination thereof, and in some embodiments, sensor data comprises information obtained from any of the sensors described herein. Other examples of sensors include, but are not limited to, location sensors, vision sensors (e.g., imaging devices capable of detecting visible, infrared, or ultraviolet light, such as cameras, etc.), proximity sensors (e.g., ultrasonic sensors, LiDAR, time-of-flight cameras, etc.), inertial sensors (e.g., accelerometers, gyroscopes, inertial measurement units (IMUs), etc.), and field sensors (e.g., magnetometers, electromagnetic sensors, etc.). In particular embodiments, one or more sensors are configured to measure health parameters such as heart rate, pulse, electric signals from the heart, blood oxygen levels, blood pressure, blood sugar level, and the like. In particular embodiments, one or more sensors are configured to measure environmental parameters such as light, motion, temperature, pressure, humidity, vibration, magnetic field, sound, smoke, carbon monoxide, radiation, hazardous chemicals, acid, base, reactive compounds, volatile organic compounds, smog, and the like.

Any suitable number and combination of sensors can be used, such as one, two, three, four, five, or more sensors. Optionally, the data can be received from sensors of different types (e.g., two, three, four, five, or more types). Sensors of different types may measure different types of signals or information and/or utilize different types of measurement techniques to obtain data. For instance, the sensors may include any suitable combination of active sensors (e.g., sensors that generate and measure energy from their own source) and passive sensors (e.g., sensors that detect available energy).

Suitable actuators include, by way of non-limiting examples, electric (e.g., a motor, servo, solenoid, piezoelectric actuator, etc.), hydraulic, pneumatic (e.g., vacuum- or compressed gas-based actuators), magnetic, thermal (e.g., shape memory alloy-based actuators), soft, and mechanical actuators.

Suitable effectors include, by way of non-limiting examples, impactive, ingressive, astrictive, and contigutive effectors.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. The network 130 may comprise ethernet, IP, serial buses, and other forms of communication between two or more IoT devices. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a cathode ray tube (CRT), a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (HMD) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, that perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PHP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C #, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, .NET Compact Framework, Rhomobile, and WorkLight Mobile Platform. Other development environments are available without cost including, by way of non-limiting examples, Lazarus, MobiFlex, MoSync, and Phonegap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, automation environment information, data source information, correlation information, link information, and timeseries information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, MongoDB, and the like. Suitable graph databases include, by way of non-limiting examples, ArangoDB, AnzoGraph DB, JanusGraph, Neo4j, Sparksee, Sqrrl Enterprise, and the like. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

EXAMPLES

The following illustrative example is representative of embodiments of the software applications, systems, media, and methods described herein and are not meant to be limiting in any way.

Exemplary Use Case 1

The systems and methods herein may be configured to continuously monitor the temperature and humidity in, for example, a greenhouse. The time-series data for the temperature and humidity sensors in the greenhouse could be analyzed using an event detection method to identify significant changes in the values. A correlation matrix of the events across the temperature and humidity points could then be calculated using, for example, Pearson's correlation coefficient. To suppress compounding factors, the correlation matrix could be normalized using techniques such as subtracting the mean and dividing by the standard deviation for each row and column. Any correlations in the matrix that cannot possibly represent a relationship between the temperature and humidity points, such as a correlation between two temperature points, could be filled with zeroes. Finally, the temperature and humidity points could be clustered based on the correlations, with each cluster representing a group of points that belong to the same device (e.g., a temperature sensor and humidity sensor in the same greenhouse).

Exemplary Use Case 2

The systems and methods herein may utilize a building automation system where sensors are placed throughout the building to collect data on various parameters such as temperature, humidity, and energy usage, etc. The collected data is then used to optimize the performance of the building's HVAC system and other systems to improve energy efficiency and comfort. In some embodiments, it is beneficial to understand which data points (e.g., temperature, humidity, and energy usage data) relate to the same device.

In this use case, event detection methods could be used to identify changes in the data that are significant enough to warrant further analysis. For example, if the temperature in a room suddenly increases by a large amount, this could be considered an event and marked as such in the data. Similarly, if there is a sudden drop in energy usage, this could also be marked as an event.

Next, a correlation matrix could be calculated to identify relationships between the different events across the points (i.e., sensors). For example, if there is a correlation between a sudden increase in temperature and a drop in energy usage, this could indicate that the HVAC system is turning off when the temperature increases, which could be a sign of a problem with the system.

The correlation matrix can then be normalized to suppress compounding factors that may be contributing to non-physical relations. For example, external factors such as the weather may affect the temperature and energy usage data, but normalizing the matrix can help to account for these factors and focus on the relationships between the points themselves.

Finally, the points can be clustered based on the correlations identified in the matrix. For example, points that are highly correlated may be considered to belong to the same device (e.g., a particular HVAC unit in the building), while points with weaker correlations may be considered to belong to different devices. This can help to identify which devices may be performing poorly or experiencing problems, allowing for targeted maintenance and repairs to be performed.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method comprising:
 a) retrieving a plurality of data points from a plurality of data sources associated with an automated environment, wherein the plurality of data points comprises data in timeseries data structure;
 b) detecting a plurality of events based on the plurality of data points, wherein an event of the plurality of data points is indicative of an anomaly reading of one or more states associated with the plurality of data sources;
 c) generating a correlation matrix of events across the plurality of data points, wherein the generating of the correlation matrix comprises transforming each of the data points into a binary variable;
 d) suppressing non-physical relation factors in the correlation matrix by normalization to generate a normalized matrix;
 e) clustering the data points based on the normalized matrix, wherein the clustered data points represent the data points belonging to a same data source;
 f) generating a map comprising the plurality of data sources and relationships between the data sources; and
 g) performing maintenance or repair on the automated environment based on the map.

2. The method of claim 1, wherein the automated environment comprises a building, a warehouse, a factory, or a campus.

3. The method of claim 1, wherein the plurality of data sources comprises Internet of Things (IoT) devices.

4. The method of claim 3, wherein the plurality of data points comprises a reading of a data source, and wherein the timeseries data structure is indicative of the reading at different time points or time periods.

5. The method of claim 1, wherein the correlation matrix is a symmetric matrix.

6. The method of claim 1, wherein (d) further comprises:
 (d1) dividing the correlation matrix into a plurality of submatrices based at least in part on a type of the data points;
 (d2) normalizing each submatrix of the plurality of submatrices by a matrix normalization mechanism;
 (d3) aggregating the plurality of normalized submatrices to generate an updated correlation matrix; and
 (d4) normalizing the updated correlation matrix by the matrix normalization mechanism.

7. The method of claim 6, wherein the type of the data points comprises an indicator of a function of the data points, respectively.

8. The method of claim 7, wherein the indicator comprises: a temperature measure, a humidity reading, a lighting reading, a motion sensor reading, a device operation reading, an air flow speed reading, or a combination thereof.

9. The method of claim 6, wherein the matrix normalization mechanism comprises a subtraction of a measure of central tendency of every row of the matrix from elements of the row, and a division of resulting elements in every row of the matrix by a measure of dispersion of every original row of the matrix.

10. The method of claim 6, wherein the matrix normalization mechanism comprises a subtraction of a measure of central tendency of every column of the matrix from elements of the column, and a division of resulting elements in every column of the matrix by a measure of dispersion of every original column of the matrix.

11. The method of claim 6, wherein the matrix normalization mechanism comprises a scaling operation of every row of the matrix between two values.

12. The method of claim 6, wherein the matrix normalization mechanism comprises a scaling operation of every column of the matrix between two values.

13. The method of claim 6, wherein the matrix normalization mechanism comprises a matrix transformation operation using a shortest path algorithm.

14. The method of claim 6, wherein the matrix normalization mechanism comprises an operation to fill a main diagonal of the matrix with zeroes.

15. The method of claim 1, wherein (e) comprises using a graph clustering algorithm.

16. The method of claim 1, wherein the correlation matrix is normalized by a link type, wherein the link type is indicative of a relationship between two data points.

17. A computer-implemented system, comprising at least one processor and instructions executable by the at least one processor to perform operations comprising:
retrieving a plurality of data points from a plurality of data sources associated with an automated environment, wherein the plurality of data points comprises data in timeseries data structure;
detecting a plurality of events based on the plurality of data points, wherein an event of the plurality of data points is indicative of an anomaly reading of one or more states associated with the plurality of data sources;
generating a correlation matrix of events across the plurality of data points, wherein the generating of the correlation matrix comprises transforming each of the data points into a binary variable;
suppressing non-physical relation factors in the correlation matrix by normalization to generate a normalized matrix;
clustering the data points based on the normalized matrix, wherein the clustered data points represent the data points belonging to a same data source;
generating a map comprising the plurality of data sources and relationships between the data sources; and
performing maintenance or repair on the automated environment based on the map.

18. One or more non-transitory computer-readable storage media coupled to one or more processors and having instructions stored thereon which, when executed by the one or more processors, cause the one or more processors to perform operations comprising:
a) retrieving a plurality of data points from a plurality of data sources associated with an automated environment, wherein the plurality of data points comprises data in timeseries data structure;
b) detecting a plurality of events based on the plurality of data points, wherein an event of the plurality of data points is indicative of an anomaly reading of one or more states associated with the plurality of data sources;
c) generating a correlation matrix of events across the plurality of data points, wherein the generating of the correlation matrix comprises transforming each of the data points into a binary variable;
d) suppressing non-physical relation factors in the correlation matrix by normalization to generate a normalized matrix;
e) clustering the data points based on the normalized matrix, wherein the clustered data points represent the data points belonging to a same data source;
f) generating a map comprising the plurality of data sources and relationships between the data sources; and
g) performing maintenance or repair on the automated environment based on the map.

19. The method of claim 1, wherein the map comprises a visualization of a distribution of different types of devices in the automated environment.

* * * * *